US006013378A

United States Patent [19]
White et al.

[11] Patent Number: 6,013,378
[45] Date of Patent: Jan. 11, 2000

[54] HMW HDPE FILM WITH IMPROVED IMPACT STRENGTH

[75] Inventors: Thomas A. White, Farmington; Ned R. Pendleton, Fairport, both of N.Y.

[73] Assignee: Tenneco Packaging, Evanston, Ill.

[21] Appl. No.: 08/818,366

[22] Filed: Mar. 17, 1997

[51] Int. Cl.[7] ........................................ B32B 27/32
[52] U.S. Cl. ........................................ 428/516; 428/515
[58] Field of Search .............................. 428/515, 516

[56] References Cited

U.S. PATENT DOCUMENTS

| | | | |
|---|---|---|---|
| 3,645,992 | 2/1972 | Elston | 260/80.78 |
| 3,748,962 | 7/1973 | Hilkert et al. | 90/4 |
| 3,986,611 | 10/1976 | Dreher | 206/386 |
| 4,011,382 | 3/1977 | Levine et al. | 526/96 |
| 4,050,221 | 9/1977 | Lancaster, III et al. | 53/211 |
| 4,076,698 | 2/1978 | Anderson et al. | 526/348.6 |
| 4,163,831 | 8/1979 | Gessell | 526/153 |
| 4,205,021 | 5/1980 | Morita et al. | 525/240 |
| 4,302,565 | 11/1981 | Goeke et al. | 526/88 |
| 4,302,566 | 11/1981 | Karol et al. | 526/125 |
| 4,359,561 | 11/1982 | Fraser et al. | 526/88 |
| 4,399,173 | 8/1983 | Anthony et al. | 428/35 |
| 4,399,180 | 8/1983 | Briggs et al. | 428/212 |
| 4,418,114 | 11/1983 | Briggs et al. | 428/218 |
| 4,461,873 | 7/1984 | Bailey et al. | 525/240 |
| 4,511,609 | 4/1985 | Craver et al. | 428/35 |
| 4,522,987 | 6/1985 | Hogan et al. | 526/106 |
| 4,565,720 | 1/1986 | Yaeo et al. | 428/35 |
| 4,574,104 | 3/1986 | Aishima et al. | 428/220 |
| 4,588,650 | 5/1986 | Mientus et al. | 428/516 |
| 4,808,561 | 2/1989 | Welborn, Jr. | 502/104 |
| 4,833,017 | 5/1989 | Benoit | 428/323 |
| 4,837,075 | 6/1989 | Dudley | 428/220 |
| 4,871,523 | 10/1989 | Datta et al. | 423/265 |
| 4,871,705 | 10/1989 | Hoel | 502/117 |
| 4,925,821 | 5/1990 | Chang | 502/107 |
| 4,925,825 | 5/1990 | Tachi et al. | 502/309 |
| 4,937,301 | 6/1990 | Chang | 526/128 |
| 5,001,205 | 3/1991 | Hoel | 526/128 |
| 5,006,500 | 4/1991 | Chang | 502/107 |
| 5,017,655 | 5/1991 | Kase et al. | 525/127 |
| 5,019,315 | 5/1991 | Wilson | 264/171 |
| 5,026,798 | 6/1991 | Canich | 526/127 |
| 5,032,652 | 7/1991 | Chang | 526/129 |
| 5,049,423 | 9/1991 | German, Jr. | 428/35.2 |
| 5,079,205 | 1/1992 | Canich | 502/117 |
| 5,084,534 | 1/1992 | Welborn, Jr. et al. | 526/160 |
| 5,085,927 | 2/1992 | Dohrer | 428/220 |
| 5,124,418 | 6/1992 | Welborn, Jr. | 526/114 |
| 5,173,343 | 12/1992 | Arvedson et al. | 428/34.9 |
| 5,183,867 | 2/1993 | Welborn, Jr. | 526/114 |
| 5,206,075 | 4/1993 | Hodgson, Jr. | 428/216 |
| 5,248,547 | 9/1993 | Wilson | 428/218 |
| 5,272,016 | 12/1993 | Ralph | 428/516 |
| 5,273,809 | 12/1993 | Simmons | 428/212 |
| 5,278,272 | 1/1994 | Lai et al. | 526/348.5 |
| 5,279,872 | 1/1994 | Ralph | 428/34.9 |
| 5,283,128 | 2/1994 | Wilhoit | 428/516 |
| 5,296,580 | 3/1994 | Matsunaga et al. | 582/502 |
| 5,334,428 | 8/1994 | Dobreski et al. | 428/34.9 |
| 5,358,792 | 10/1994 | Mehta et al. | 428/516 |
| 5,374,459 | 12/1994 | Mumpower et al. | 428/36.7 |
| 5,376,439 | 12/1994 | Hodgson et al. | 428/220 |
| 5,380,810 | 1/1995 | Lai et al. | 56/352 |

(List continued on next page.)

FOREIGN PATENT DOCUMENTS

| | | |
|---|---|---|
| 0 600 425 | 11/1993 | European Pat. Off. . |
| WO 92/17539 | 10/1992 | WIPO . |
| WO 4/14855 | 7/1994 | WIPO . |
| WO 94/25271 | 11/1994 | WIPO . |
| WO 94/26816 | 11/1994 | WIPO . |

OTHER PUBLICATIONS

Leaversuch, R., "LDPE, mPE vie in Flexible Film Market", *Modern Plastics*, Sep. 1994, pp. 23 & 25.
Product Literature, *To Give Your Customers' Used Stretch Film A New Lease On Life, Turn The Page*, Mobil, 4 pgs.
Chowdhury, et al., "Polymers by Blueprint: Metallocene catalysts, the biggest thing to hit plastics since LLDPE, transform workhorse resins into engineering plastics," *Chemical Engineering* (Apr. 1993), pp. 34–39.
Schut, "Competition for Metallocenes Could Turn Ugly," *Plastics World* (Jan. 1995), pp. 33–36.
Product Literature, Dow Chemical Company, "Dow Resins for Stretch Film Applications—An Overview", p. 1.5, Oct. 1994.
Product Literature, Dow Chemical Company, "Dow Skin Resins for Cast Stretch Film Applications", pp. 3.1–3.4, Oct., 1994.
Product Literature, Dow Chemical Company, "ENGAGE Polyolefin Elastomer for Industrial Collation Packaging", KC 8852, May, 1994.
"Advantages of Metallocene Ethylene Polymer Resin Blends in Blown and Cast Films", Research Disclosure, Aug. 1995, pp. 565–573.
"Advantages of Metallocene Ethylene Polymer Resin Blends in Cast Film", Research Disclosure, Aug. 1995, pp. 556–557.
"Advantages of Metallocene Ethylene Polymer Resin in Blown and Cast Stretch Films", Research Disclosure, Aug. 1995, pp. 539–545.

*Primary Examiner*—Paul Thibodeau
*Assistant Examiner*—D. Lawrence Tarazano
*Attorney, Agent, or Firm*—Arnold White & Durkee

[57] ABSTRACT

A polymeric multilayer film is disclosed that has improved gloss, dart drop and total energy dart drop while having structural qualities that are not significantly compromised. The film is composed of first film layer of a low polydispersity polyethylene copolymer and a second film layer of a high molecular weight high density polyethylene (HMW HDPE) polymer. The first film layer polymer has a polydispersity of from about 1 to about 4. In a preferred embodiment, this low polydispersity polymer is formed in the presence of a metallocene catalyst. The HMW HDPE polymer has a melt index of less than 0.1 and a density of at least about 0.940 g/cm$^3$. Any of the layers of the film may be constructed of polymer blends with additional layers being contemplated.

59 Claims, No Drawings

U.S. PATENT DOCUMENTS

| | | | |
|---|---|---|---|
| 5,382,631 | 1/1995 | Stehling et al. | 525/240 |
| 5,395,471 | 3/1995 | Obijeski et al. | 156/244.11 |
| 5,397,613 | 3/1995 | Georgelos | 428/36.7 |
| 5,397,640 | 3/1995 | Georgelos et al. | 428/349 |
| 5,399,426 | 3/1995 | Koch et al. | 428/335 |
| 5,407,732 | 4/1995 | Dokurno | 428/213 |
| 5,419,795 | 5/1995 | Wood et al. | 156/184 |
| 5,419,934 | 5/1995 | Wilson | 428/34.9 |
| 5,420,220 | 5/1995 | Cheruvu et al. | 526/348.1 |
| 5,431,284 | 7/1995 | Wilson | 206/597 |
| 5,451,450 | 9/1995 | Erderly et al. | 428/220 |
| 5,451,468 | 9/1995 | Seiler et al. | 428/515 |
| 5,460,861 | 10/1995 | Vicik et al. | 428/34.9 |
| 5,462,807 | 10/1995 | Halle et al. | 428/500 |
| 5,482,770 | 1/1996 | Bekele | 428/339 |
| 5,482,771 | 1/1996 | Shah | 428/349 |
| 5,491,019 | 2/1996 | Kuo | 428/213 |
| 5,523,136 | 6/1996 | Fischer et al. | 428/35.2 |
| 5,530,065 | 6/1996 | Farley et al. | 525/240 |
| 5,543,223 | 8/1996 | Shah | 428/349 |
| 5,558,930 | 9/1996 | DiPoto | 428/216 |
| 5,576,038 | 11/1996 | Moore et al. | 426/127 |
| 5,595,050 | 1/1997 | Koch et al. | 53/441 |
| 5,617,707 | 4/1997 | Simmons | 53/441 |

HMW HDPE FILM WITH IMPROVED IMPACT STRENGTH

FIELD OF THE INVENTION

The present invention relates generally to polymer films. More particularly, the present invention relates to the use of particular polymers in films to improve dart drop value, total energy dart drop and gloss without compromising key structural characteristics.

BACKGROUND OF THE INVENTION

The films of the present invention are particularly adapted and useful in bags used for liner applications. Bag liners may be used to collect waste at restaurants, hotels or business locations. Some of the properties desired of these films are as follows: puncture resistance, tear resistance and tensile strength in the transverse and machine directions, high gloss, end use impact resistance, the ability to produce the film in thin gauges, low specific gravity and thus high yield in area per pound, tensile toughness, and high modulus of elasticity.

Of particular importance in the present application are improved dart drop, total energy dart drop and gloss. Improved dart drop and total energy dart drop are desirable because liners preferably should remain intact to prevent items such as waste from protruding out of the liner. Gloss is desirable because it provides a surface which is attractive and aesthetically pleasing to consumers.

A particular film is selected for an end use because of the particular properties it possesses. A film may have some properties which are desirable and others which are less so. For example, while a pure high molecular weight high density polyethylene (HMW HDPE) film has superior strength, toughness and puncture resistance, it has significant shortcomings with respect to gloss and dart drop values. Another film, metallocene-catalyzed polyethylene, while having superior gloss, has only moderate tensile strength and significant cost limitations.

A need, therefore, exists for films which have excellent impact and overall toughness as well as superior gloss without compromising key structural characteristics.

SUMMARY OF THE INVENTION

The present invention is a multilayered film which has excellent end use impact resistance, overall toughness and gloss. The inventive film comprises a first layer of a polyethylene copolymer having a low polydispersity ($M_w/M_n$ or MWD) of from about 1 to about 4, a density of from about 0.88 to about 0.94, a melt index ($I_2$) of from about 0.3 to about 10 and a melt flow ratio ($I_{20}/I_2$) of from about 12 to about 22. The first film layer is preferably produced utilizing metallocene catalyst polymerization techniques. The inventive multilayer film also possesses a second film layer. The second film layer comprises a high molecular weight high density polyethylene (HMW HDPE) polymer having a melt index of less than about 0.1 and a density of at least about 0.940 g/cm$^3$. Optionally, a third film layer, located between the first and second layers, is comprised of a HMW HDPE polymer or a low polydispersity copolymer. Thus, the film is constructed with at least two layers; additional layers are contemplated.

The inventive film comprises at least 20 weight percent low polydispersity polyethylene copolymer of the total film structure. The film produced has a gloss of at least about 25%, a total energy drop value of at least about 20 in-lbs/mil, and an F-50 dart drop value of at least about 350 g/mil.

In a preferred embodiment, the first film layer is a metallocene-catalyzed polyethylene which is coextruded with the second film layer of HMW HDPE polymer. Alternatively, the first film layer may contain a blend of metallocene-catalyzed polyethylene with either another polyolefin or a HMW HDPE polymer. The second layer and an optional third layer may be prepared with the HMW HDPE polymer or with a blend of polymers.

The multilayer films of the present invention, which are constructed with a first layer of a low polydispersity polyethylene copolymer and a second film layer comprising a HMW HDPE film, have been found to display improved gloss, total energy dart drop, and dart drop. The multilayer films of the present invention also have reasonable tensile properties and tear resistance in both the transverse and machine directions compared to other film constructions without significant degradation of other key film properties. For example, films constructed solely of HMW HDPE have poor gloss and have limited dart drop and total energy drop performance. Low polydispersity polymer films, such as metallocene-catalyzed polyethylene, have moderate tensile strength and significant cost limitations.

DETAILED DESCRIPTION OF THE INVENTION

The first film layer of the multilayer film of the present invention comprises a polymer resin having a low polydispersity. In a preferred embodiment, this low polydispersity polymer is prepared with ethylene in a major amount by weight and at least one alpha olefin comonomer, e.g. a copolymer or terpolymer in the presence of a single-site or constrained geometry catalyst technology catalyst, in a minor amount by weight. The alpha olefin comonomer generally has from about 3 to about 12 carbon atoms, preferably from about 4 to about 10 carbon atoms, and more preferably from about 6 to about 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene, 1-octene, 1-decene, and 1-dodecene. In a preferred embodiment, the single-site catalyst is metallocene. The low polydispersity polymer used for the first film layers generally has the characteristics associated with a linear low density polyethylene (LLDPE) material, however it has improved properties as explained more fully below. The low polydispersity polymer of the first film layer has a density of from about 0.88 to about 0.94 g/cm$^3$, preferably from about 0.88 to about 0.93 g/cm$^3$, and more preferably from about 0.88 to about 0.925 g/cm$^3$.

The weight average molecular weight of the low polydispersity polymer can generally range from about 20,000 to about 500,000, preferably from about 50,000 to about 200,000. The molecular weight is determined by commonly used techniques such as size exclusion chromatography or gel permeation chromatography. The low polydispersity polymer should have a molecular weight distribution, or polydispersity, ($M_w/M_n$, "MWD") within the range of about 1 to about 4, preferably about 1.5 to about 4, more preferably about 2 to about 4, and even more preferably from about 2 to about 3. The ratio of the third moment to the second moment ($M_z/M_w$) is generally below about 2.3, preferably below about 2.0, and more typically in the range of from about 1.6 to about 1.95. The melt flow ratio (MFR) of these resins, defined as $I_{20}/I_2$ and as determined in accordance with ASTM D-1238, is generally from about 12 to about 22, preferably from about 14 to about 20, and more preferably from about 16 to about 18. The melt index (MI), defined as the $I_2$ value, should be in the range of from about 0.3 to about 10, preferably from about 0.5 to about 5 and more preferably from about 0.5 to about 2.

Useful low polydispersity polymers are available from, among others, Dow Chemical Company and Exxon Chemical Company who are producers of single site or constrained geometry catalyzed polyethylenes. These resins are commercially available as the AFFINITY and EXXACT polyethylenes (see *Plastics World,* p. 33–36, January 1995), and also as the ENHANCED POLYETHYLENE and EXCEED line of resins. The manufacture of such polyethylenes, generally by way of employing a metallocene catalyst system, is set forth in, among others, U.S. Pat. Nos. 5,382,631, 5,380,810, 5,358,792, 5,206,075, 5,183,867, 5,124,418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is hereby incorporated herein by reference in its entirety. These catalyst systems and their use to prepare such low polydispersity polymers are also set forth in EP 0 600 425 A1 and PCT applications WO 94/25271 and 94/26816. The polyethylene resins thus produced generally have a crystalline content in excess of at least 10 weight percent, generally in excess of at least 15 weight percent.

The above patents and publications generally report that these catalysts contain one or more cyclopentadienyl moieties in combination with a transition metal. The metallocene catalyst may be represented by the general formula $C_cMA_aB_b$ wherein C is a substituted or unsubstituted cyclopentadienyl ring; M is a Group 3–10 metal or Lanthanide series element, generally a Group IVB, VB, or VIB metal; A and B are independently halogen, hydrocarbyl group, or hydrocarboxyl groups having 1–20 carbon atoms; a=0–3, b=0–3, and c=1–3. The reactions can take place in either gas phase, high pressure, slurry, or solution polymerization schemes.

The first film layer of the multilayer film of the present invention is preferably constructed entirely with the low polydispersity polyethylene polymer, preferably produced through the metallocene catalyst technology. The first film layer may also comprise a blend of the low polydispersity polymer with a second resin material. The second resin material is preferably a LLDPE resin having a density of between about 0.89 and about 0.94 g/cm$^3$, a LDPE resin having a density of between about 0.9 and about 0.935 g/cm$^3$, a VLDPE resin having a density of between about 0.88 and about 0.91 g/cm$^3$ or up to about 20% of a HMW HDPE having a density of between about 0.941 and about 0.965. The comonomer for the second resin material preferably has from about 4 to about 10, more preferably about 6 to about 8 carbon atoms. If a second resin material is to be incorporated with the metallocene-catalyzed resin, it is preferred to maintain the level of the metallocene-catalyzed resin to at least about 40 wt. %, preferably at least about 50 wt. %, and more preferably at least about 60 wt. %, of the first film layer. The resultant blended polymer resin maintains the desired properties of the metallocene-catalyzed resin material and may be more economical for certain applications.

The multilayer films of the present invention are constructed with at least one layer of a HMW HDPE resin. The HMW HDPE has a melt index of less than about 0.1 and a density of at least about 0.940 g/cm$^3$. Preferably, this film layer is composed solely of the HMW HDPE. Alternatively, the film layer may be composed of a blend of HMW HDPE and a low polydispersity polymer. If a blend is employed, the percentage of low polydispersity polymer is preferably no more than about 30 wt. %.

The films of the present invention can be constructed to contain a plurality of layers in various combinations. According to one embodiment, the film will be of an A/B construction wherein the first film layer (layer A) is a low polydispersity resin and a second film layer (layer B) is a HMW HDPE resin. In an embodiment where the film forms a bag, the first film layer may be located as either the outer layer or the inner layer of the bag. Thus, either the first film layer or the second film layer may be located as the outer surface of a bag. The first film layer of metallocene-catalyzed polyethylene may be coextruded with a second film layer of HMW HDPE polymer. In a preferred embodiment, the total weight percent of low polydispersity polymer in the film is between about 20 wt. % and about 50 wt. %.

Alternatively, the film may be an A/B/B construction, wherein the first film layer (layer A) is a low polydispersity resin and the second and third film layers (layers B) are comprised from HMW HDPE resin. Alternatively, a blend of a low polydispersity resin such as metallocene-catalyzed polyethylene and another polyolefin may be substituted for the metallocene-catalyzed polyethylene in comprising the first film layer. In an embodiment where the film forms a bag, the first film layer may be located as either the outer layer or the inner layer of the bag. The first film layer may also be a blend of metallocene-catalyzed polyethylene and HMW HDPE polymer.

According to another embodiment, the film may be an B/A/B or an A/A/B construction, wherein layer A comprises low polydispersity resins and layer B comprises HMW HDPE resins. As in the other embodiments described above, film layers A and B may be constructed from polymer blends.

Additional multi-layered embodiments are contemplated such as a four, five or more layered embodiments. For example, the film may be an A/A/B/B, an A/B/A/B, A/B/B/B, or an A/A/A/B construction wherein layer A comprises low polydispersity resins and layer B comprises HMW HDPE resins. In an embodiment where the film forms a bag, the first film layer may be located as either the outer layer or the inner layer of the bag. Film layers A and B may be constructed from polymer blends. In another example, the film may be an A/A/B/B/B or an A/A/A/B/B construction. Other types of multi-layered constructions are contemplated.

The films of the present invention have relatively high puncture resistance or impact resistance, as measured by the F-50 dart drop test procedure (ASTM D1709). It is the experience of those skilled in the art that the F-50 dart drop test is well correlated to the end use impact resistance of films. The F-50 dart drop value of the films is at least about 350 g/mil, preferably at least about 600 g/mil, and more preferably from at least about 700 g/mil.

The films of the present invention are constructed to have relatively high total energy dart drop (TEDD), as determined by ASTM D4272. It is the experience of those skilled in the art that the TEDD test is well correlated to the end use impact resistance of films. The TEDD of the present invention is at least about 20 in-lbs/mil, preferably at least about 40 in-lbs/mil, and more preferably at least about 50 in-lbs/mil.

The films of the present invention are constructed to have a relatively high gloss, as determined by ASTM D2457. The gloss of the present invention is at least about 25%, preferably at least about 30%, and more preferably at least about 40%.

The film configurations are constructed according to conventional practices. Generally, the preferred processing technique is to coextrude the films in a simultaneous fashion, however in some cases it may be appropriate to first coextrude at least two film layers and thereafter extrusion coat the remaining film layer. It is preferred to employ conventional techniques of coextrusion to assemble the composite structures of the films of this invention. Generally, the resin materials are heated to their molten state and their viscosities are coordinated to prepare multilayer films in a uniform manner. The molten materials are conveyed to a coextrusion adapter that combines the molten materials to form a multilayer coextruded structure. The layered polymeric material is transferred through an extrusion die opened to a predetermined gap commonly in the range of between about 0.05 in. (0.13 cm) and 0.12 in. (0.3 cm). The material is then drawn down to the intended gauge thickness by a machine direction draw down followed by a bubble inflation to reduce the film to the desired thickness and width. Typical draw down ratios range from about 10:1 to about 150:1.

The overall thickness of the film can vary widely according to end use specifications, but is generally in the range of the typical thicknesses for films. Conventional for such films is a thickness of from about 0.2 to about 2.0 mil, and is application specific.

In the present invention wherein the multilayer films are of a coextruded nature, it is preferred that the low polydispersity polyethylene copolymer of the total film structure comprises from about 20 wt. % to about 50 wt. %, and more preferably from about 25 wt. % to about 50 wt. % weight and most preferably from about 30 wt. % to about 40 wt. % of the total film weight. The HMW HDPE layer or layers combined will account for the balance of the film, and generally will comprise from about 50 wt. % to about 80 wt. % and more preferably from about 50 wt. % to about 75 wt. %, and most preferably from about 60 wt. % to about 70 wt. % of the total film weight.

Either or all the film layers of the film can be treated by such known and conventional post-forming operations as corona discharge, chemical treatment, flame treatment, etc., to modify the printability or ink receptivity of the surface(s) or to impart other desirable characteristics thereto.

EXAMPLE

The films of the present invention were tested using the following procedures:

FILM TEST PROCEDURES

| TEST PROCEDURE | ASTM TEST METHOD |
|---|---|
| Tensile Yield Machine Direction (MD) | D882 |
| Tensile Ultimate MD | D882 |
| Tensile Elongation MD | D882 |
| Elmendorf Tear MD | D1922 |
| Elmendorf Tear Transverse Direction (TD) | D1922 |
| Total Energy Dart Drop | D4272 |
| F-50 Dart Drop | D1709 |
| Gardner Gloss | D2457 |
| Gardner Haze | D1003 |

The results of the tests appear in the Table. The inventive films were all coextruded in a three layer embodiment of A/B/B. The first film layer (layer A) of the inventive films was comprised of metallocene-catalyzed low polydispersity polyethylene polymers or "mLLDPE". The first film layer was formed from an alpha olefin comonomer of either 1-hexane or 1-octene.

The second and third layers (layers B) of each inventive film was comprised of 100% HMW HDPE polymer or "HMW". The HMW HDPE polymer of the second and third layers had a melt flow rate of from about 140 to about 180, a melt index of about 0.045 and a density of about 0.95. The composition of each layer is shown in weight percent of each component in each layer, rather than the overall film composition. For example, in the Table, the inventive film 2 had a second layer of HMW comprising 20% wt. % of film 2, but the total weight percent of HMW in the film is 70 wt. %.

Referring specifically to the Table, inventive film 2 had a first film layer of a 1.0 MI metallocene-catalyzed polyethylene resin, while inventive film 3 had a first film layer of a 0.75 MI metallocene-catalyzed polyethylene resin. These inventive films significantly improve the F-50 dart drop value, the TEDD and the gloss over the control film. Inventive films 2 and 3 had a lower TD tear and toughness than the control film 1, but is adequate for most applications.

Inventive films 4 and 5 had higher gauges than the control film 1. Inventive film 4 had a first film layer of 1.0 MI metallocene-catalyzed polyethylene resin, while inventive film 5 had a first film layer of a 0.75 MI metallocene-catalyzed polyethylene resin. The inventive films 4 and 5 improved the TEDD and the gloss over the control film 1. However, only inventive film 5 improved the F-50 dart drop over the control film 1. Inventive films 4 and 5 had a lower TD tear and toughness than the control film 1, but is adequate for most applications.

TABLE

| Film # | Control 1 | Inventive 2 | Inventive 3 | Inventive 4 | Inventive 5 |
|---|---|---|---|---|---|
| First Layer | HMW | mLLDPE (1.0 MI) | mLLDPE (0.75 MI) | mLLDPE (1.0 MI) | mLLDPE (0.75 MI) |
| % of total bag | 17.5 | 30 | 30 | 30 | 30 |
| Third Layer | HMW | HMW | HMW | HMW | HMW |
| % of total bag | 65 | 50 | 50 | 50 | 50 |
| Second Layer | HMW | HMW | HMW | HMW | HMW |
| % of total bag | 17.5 | 20 | 20 | 20 | 20 |
| Gauge, mil | 0.3 | 0.3 | 0.3 | 0.5 | 0.5 |
| MD TEAR, GMS | 4 | 4 | 5 | 10 | 9 |

TABLE-continued

| Film # | Control 1 | Inventive 2 | Inventive 3 | Inventive 4 | Inventive 5 |
| --- | --- | --- | --- | --- | --- |
| TD TEAR, GMS | 85 | 32 | 25 | 69 | 43 |
| MD YIELD, LBS | 2 | 1.5 | 1.4 | 2 | 2.2 |
| MD ULTIMATE, LBS | 4.1 | 3.4 | 3 | 4.7 | 5.1 |
| MD ELONGATION, % | 293 | 281 | 292 | 351 | 352 |
| MD TOUGHNESS | 2353 | 1892 | 1916 | 1736 | 1661 |
| MD PPT, CM* | 6.6 | 6.3 | 7.2 | 5.1 | 4.9 |
| DART, F50, GMS/mil | 563 | 620 | 793 | 366 | 626 |
| TEDD, IN-LBS | 9.9 | 12.3 | 16.9 | 10.6 | 14.1 |
| PUNCTURE, LBS | 3.3 | 3.3 | 2.5 | 4 | 3.5 |
| HAZE* | 63.9 | 50.5 | 49.8 | 57.8 | 56.6 |
| GLOSS % | 11.4 | 41.5 | 35.6 | 42.8 | 424 |

MDPPT = machine direction puncture propagation tear
TEDD = total energy dart drop
*a lower number is better

What is claimed is:

1. A multilayer, thermoplastic film comprising:
   (a) a first film layer comprising a polyethylene copolymer, said polyethylene copolymer having a polydispersity of from about 1 to about 4, a density of from about 0.88 to about 0.94 g/cm$^3$, a melt index ($I_2$) of from about 0.3 to about 10 g/10 min., and a melt flow ratio ($I_{20}/I_2$) of from about 12 to about 22;
   (b) a second film layer comprising a high density polyethylene polymer having a melt index of less than about 0.1 g/10 min. and a density of at least about 0.940 g/cm$^3$; and
   wherein the multilayer film comprises at least 20 weight percent of the polyethylene copolymer;
   so as to produce a multilayer film having a gloss of at least about 25% as determined by ASTM D2457, a total energy drop value of at least about 20 in-lbs/mil as determined by ASTM D4272, and an F-50 dart drop value of at least about 350 g/mil as determined by ASTM D1709.

2. The thermoplastic film of claim 1 wherein the polydispersity of the polyethylene copolymer in the first film layer is in the range of from about 1.5 to about 4.

3. The thermoplastic film of claim 2 wherein the polydispersity of the polyethylene copolymer in the first film layer is in the range of from about 2 to about 4.

4. The thermoplastic film of claim 3 wherein the polydispersity of the polyethylene copolymer in the first film layer is in the range of from about 2 to about 3.

5. The thermoplastic film of claim 1 wherein the density of the polyethylene copolymer in the first film layer is in the range of from about 0.88 to about 0.93 g/cm$^3$.

6. The thermoplastic film of claim 5 wherein the density of the polyethylene copolymer in the first film layer is in the range of from about 0.88 to about 0.925 g/cm$^3$.

7. The thermoplastic film of claim 1 wherein the melt index of the polyethylene copolymer in the first film layer is in the range of from about 0.5 to about 5 g/10 min.

8. The thermoplastic film of claim 7 wherein the melt index of the polyethylene copolymer in the first film layer is in the range of from about 0.5 to about 2 g/10 min.

9. The thermoplastic film of claim 1 wherein the melt flow ratio of the polyethylene copolymer in the first film layer is in the range of from about 14 to about 20.

10. The thermoplastic film of claim 9 wherein the melt flow ratio of the polyethylene copolymer in the first film layer is in the range of from about 16 to about 18.

11. The thermoplastic film of claim 1 wherein the first film layer comprises a polyethylene copolymer having a weight average molecular weight in the range of from about 20,000 to about 500,000.

12. The thermoplastic film of claim 11 wherein the first film layer comprises a polyethylene copolymer having a weight average molecular weight in the range of from about 50,000 to about 200,000.

13. The thermoplastic film of claim 1 wherein the polyethylene copolymer of the first film layer is made with a metallocene catalyst.

14. The thermoplastic film of claim 1 wherein the F-50 dart drop value is at least about 600 g/mil.

15. The thermoplastic film of claim 14 wherein the F-50 dart drop value is at least about 700 g/mil.

16. The thermoplastic film of claim 1 wherein the total energy drop value is at least 40 in-lbs/mil.

17. The thermoplastic film of claim 16 wherein the total energy drop value is at least 50 in-lbs/mil.

18. The thermoplastic film of claim 1 wherein the gloss is at least about 30%.

19. The thermoplastic film of claim 18 wherein the gloss is at least about 40%.

20. The thermoplastic film of claim 1 wherein the total film weight comprises from about 20 wt. % to about 50 wt. % of the polyethylene copolymer.

21. The thermoplastic film of claim 20 wherein the total film weight comprises from about 25 wt. % to about 50 wt. % of the polyethylene copolymer.

22. The thermoplastic film of claim 21 wherein the total film weight comprises from about 30 wt. % to about 40 wt. % of the polyethylene copolymer.

23. The thermoplastic film of claim 1 wherein the polyethylene copolymer of the first film layer is a polymer which comprises two or more monomers, wherein a first monomer is ethylene, in a major amount by weight, and a second monomer is an alpha olefin of from about 3 to about 12 carbon atoms, in a minor amount by weight.

24. The thermoplastic film of claim 23 wherein the second monomer is chosen from a group consisting of propylene, 1-butene, 1-pentene, 1-hexene, 3-methyl-1-pentene, 4-methyl-1-pentene, 1-octene, 1-decene, and 1-dodecene.

25. The thermoplastic film of claim 24 wherein the second monomer is chosen from a group consisting of 1-butene, 1-hexene, and 1-octene.

26. The thermoplastic film of claim 1 wherein the first film layer is a blend of polymers which comprises at least about 40 wt. % of the polyethylene copolymer and no more than 60 wt. % of a second resin material.

27. The thermoplastic film of claim 26 wherein the second resin material is chosen from the group consisting of a linear low density polyethylene resin having a density of between about 0.89 and 0.94 g/cm$^3$, a low density polyethylene resin having a density of between about 0.9 and 0.935 g/cm$^3$, and a very low density polyethylene resin having a density of between about 0.88 and 0.91 g/cm$^3$.

28. The thermoplastic film of claim 26 wherein the second resin material consists of a high density polyethylene polymer having a density of between about 0.941 and about 0.965 g/cm$^3$ and has a melt index of less than about 0.1 g/min. and is present in an amount less than or equal to about 20 wt. % of the first film layer.

29. The thermoplastic film of claim 1 wherein the second film layer is a blend of polymers comprising at least about 70 wt. % of the high density polyethylene polymer and no more than 30 wt. % of a polyethylene copolymer having a polydispersity of from about 1 to about 4, a density of from about 0.88 to about 0.94 g/cm$^3$, a melt index ($I_2$) of from about 0.3 to about 10 g/10 min., and a melt flow ratio ($I_{20}/I_2$) of from about 12 to about 22.

30. The thermoplastic film of claim 1 wherein said high density polyethylene polymer has a melt index of about 0.045 g/10 min.

31. The thermoplastic film of claim 1 wherein said high density polyethylene polymer has a melt flow rate of from about 140 to about 180.

32. A multilayer, thermoplastic film comprising:
  (a) a first film layer comprising a polyethylene copolymer, said polyethylene copolymer having a polydispersity of from about 1 to about 4, a density of from about 0.88 to about 0.94 g/cm$^3$, a melt index ($I_2$) of from about 0.3 to about 10 g/10 min., and a melt flow ratio ($I_{20}/I_2$) of from about 12 to about 22;
  (b) a second film layer comprising a high density polyethylene polymer having a melt index of less than about 0.1 g/10 min. and a density of from about 0.940 g/cm$^3$ to about 0.965 g/cm$^3$;
  (c) a third film layer, located between the first and second film layers, comprising a high density polyethylene polymer or a polyethylene copolymer, said high density polyethylene polymer having a melt index of less than about 0.1 g/10 min. and a density of at least about 0.940 g/cm$^3$, said polyethylene copolymer having a polydispersity of from about 1 to about 4, a density of from about 0.88 to about 0.94 g/cm$^3$, a melt index of from about 0.3 to about 10 g/10 min., and a melt flow ratio ($I_{20}/I_2$) of from about 12 to about 22; and
  wherein the multilayer film comprises at least 20 weight percent of the polyethylene copolymer;
  so as to produce a multilayer film having a gloss of at least about 25% as determined by ASTM D2457, a total energy drop value of at least about 20 in-lbs/mil as determined by ASTM D4272, and an F-50 dart drop value of at least about 350 g/mil as determined by ASTM D1709.

33. The thermoplastic film of claim 32 wherein the polydispersity of the polyethylene copolymer in the first film layer is in the range of from about 2 to about 4.

34. The thermoplastic film of claim 32 wherein the melt index of the polyethylene copolymer in the first film layer is in the range of from about 0.5 to about 5 g/10 min.

35. The thermoplastic film of claim 32 wherein the melt flow ratio of the polyethylene copolymer in the first film layer is in the range of from about 14 to about 20.

36. The thermoplastic film of claim 32 wherein the first film layer comprises a polyethylene copolymer having a weight average molecular weight in the range of from about 20,000 to about 500,000.

37. The thermoplastic film of claim 32 wherein the polyethylene copolymer of the first film layer is made with a metallocene catalyst.

38. The thermoplastic film of claim 32 wherein the F-50 dart drop value is at least about 600 g/mil.

39. The thermoplastic film of claim 32 wherein the total energy drop value is at least 40 in-lbs/mil.

40. The thermoplastic film of claim 32 wherein the gloss is at least about 30%.

41. The thermoplastic film of claim 32 wherein the total film weight comprises from about 20 wt. % to about 50 wt. % of the polyethylene copolymer.

42. The thermoplastic film of claim 41 wherein the total film weight comprises from about 30 wt. % to about 40 wt. % of the polyethylene copolymer.

43. The thermoplastic film of claim 32 wherein the polyethylene copolymer of the first film layer is a polymer which comprises two or more monomers, wherein a first monomer is ethylene, in a major amount by weight, and a second monomer is an alpha olefin of from about 3 to about 12 carbon atoms, in a minor amount by weight.

44. The thermoplastic film of claim 43 wherein the second monomer is chosen from a group consisting of propylene, 1-butene, 1-pentene, 1-hexene, 3-methyl-1-pentene, 4-methyl-1-pentene, 1-octene, 1-decene, and 1-dodecene.

45. The thermoplastic film of claim 44 wherein the second monomer is chosen from a group consisting of 1-butene, 1-hexene, and 1-octene.

46. The thermoplastic film of claim 32 wherein the first film layer is a blend of polymers which comprises at least about 40 wt. % of the polyethylene copolymer and no more than 60 wt. % of a second resin material.

47. The thermoplastic film of claim 46 wherein the second resin material is chosen from the group consisting of a linear low density polyethylene resin having a density of between about 0.89 and 0.94 g/cm$^3$, a low density polyethylene resin having a density of between about 0.9 and 0.935 g/cm$^3$, and a very low density polyethylene resin having a density of between about 0.88 and 0.91 g/cm$^3$.

48. The thermoplastic film of claim 46 wherein the second resin material consists of a high density polyethylene polymer having a density of between about 0.941 and about 0.965 g/cm$^3$ and has a melt index of less than about 0.1 g/min. and is present in an amount less than or equal to about 20 wt. % of the first film layer.

49. The thermoplastic film of claim 32 wherein the second film layer is a blend of polymers comprising at least about 70 wt. % of the high density polyethylene polymer and no more than 30 wt. % of a polyethylene copolymer, said polyethylene copolymer having a polydispersity of from about 1 to about 4, a density of from about 0.88 to about 0.94 g/cm$^3$, a melt index ($I_2$) of from about 0.3 to about 10 g/10 min., and a melt flow ratio ($I_{20}/I_2$) of from about 12 to about 22.

50. The thermoplastic film of claim 32 wherein
  (a) the first film layer consists essentially of the polyethylene copolymer;
  (b) the second film layer consists essentially of the high density polyethylene polymer; and
  (c) the third film layer consists essentially of the high density polyethylene polymer or the polyethylene copolymer.

51. The thermoplastic film of claim 32 wherein said high density polyethylene polymer has a melt index of about 0.045 g/10 min.

52. The thermoplastic film of claim 32 wherein said high density polyethylene polymer has a melt flow rate of from about 140 to about 180.

53. A multilayer, thermoplastic film comprising:
(a) a first film layer comprising a polyethylene copolymer, said polyethylene copolymer having a polydispersity of from about 1 to about 4, a density of from about 0.88 to about 0.94 g/cm$^3$, a melt index ($I_2$) of from about 0.3 to about 10 g/10 min., and a melt flow ratio ($I_{20}/I_2$) of from about 12 to about 22;
(b) a second film layer comprising a high density polyethylene polymer having a melt index of less than about 0.1 g/10 min., a melt flow rate of from about 140 to about 180, and a density of at least about 0.940 g/cm$^3$; and wherein the multilayer film comprises at least 20 weight percent of polyethylene copolymer;

so as to produce a multilayer film having a gloss of at least about 25% as determined by ASTM D2457, a total energy drop value of at least about 20 in-lbs/mil as determined by ASTM D4272, and an F-50 dart drop value of at least about 350 g/mil as determined by ASTM D1709.

54. The thermoplastic film of claim 53 wherein the density of the high density polyethylene polymer is from about 0.941 to about 0.965 g/cm$^3$.

55. The thermoplastic film of claim 53 wherein said high density polyethylene polymer has a melt index of about 0.045 g/10 min.

56. The thermoplastic film of claim 53 wherein the polydispersity of the polyethylene copolymer in the first film layer is in the range of from about 2 to about 3.

57. The thermoplastic film of claim 53 wherein the polyethylene copolymer of the first film layer is made with a metallocene catalyst.

58. The thermoplastic film of claim 53 wherein the total film weight comprises from about 20 wt. % to about 50 wt. % of the polyethylene copolymer.

59. The thermoplastic film of claim 53, wherein the polyethylene copolymer of the first film layer is a polymer which comprises two or more monomers, wherein a first monomer is ethylene, in a major amount by weight, and a second monomer is an alpha olefin of from about 3 to about 12 carbon atoms, in a minor amount by weight.

* * * * *